Figure 1:
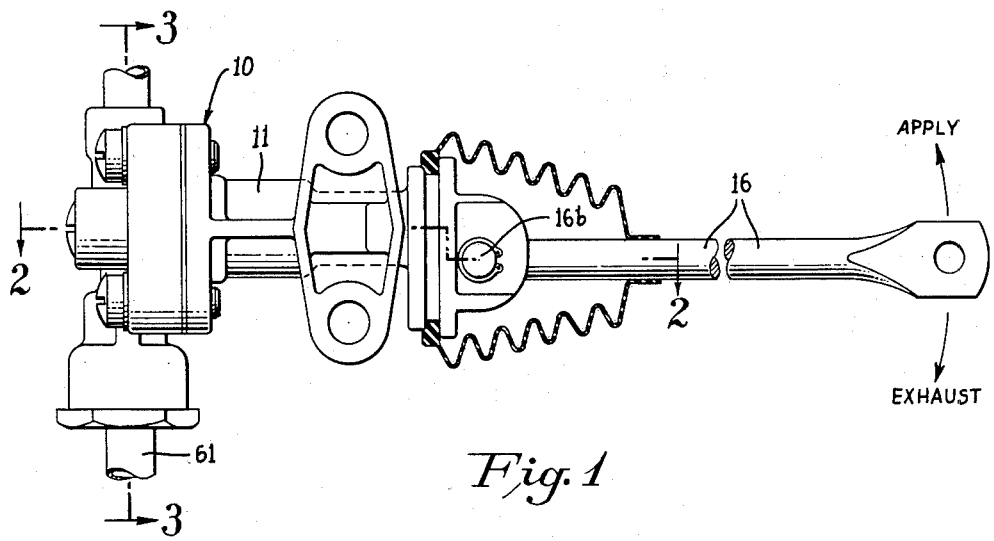

March 31, 1964  F. O. E. SCHULTZ ETAL  3,127,189
AUTOMATIC CONTROL FOR VEHICLE SUSPENSION
Filed July 2, 1956  3 Sheets-Sheet 1

INVENTORS
FORREST O. E. SCHULTZ
JOHN R. ALMOND
BY John W. Pease
ATTORNEY.

March 31, 1964  F. O. E. SCHULTZ ETAL  3,127,189
AUTOMATIC CONTROL FOR VEHICLE SUSPENSION
Filed July 2, 1956  3 Sheets-Sheet 2

INVENTORS
FORREST O. E. SCHULTZ
JOHN R. ALMOND
BY John W. Pease
ATTORNEY.

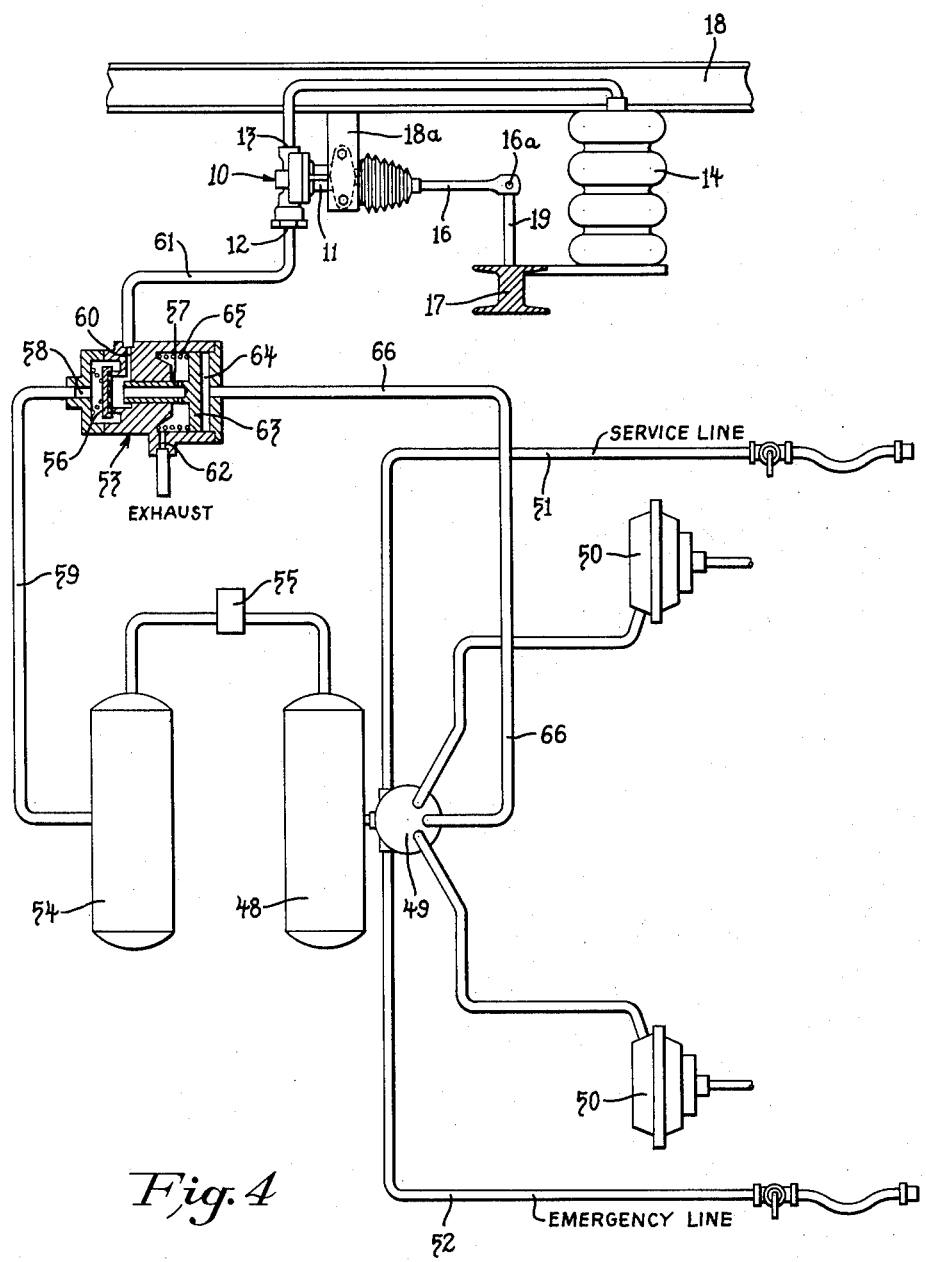

United States Patent Office 3,127,189
Patented Mar. 31, 1964

3,127,189
AUTOMATIC CONTROL FOR VEHICLE
SUSPENSION
Forrest O. E. Schultz and John R. Almond, Detroit, Mich., assignors to Midland-Ross Corporation, a corporation of Ohio
Filed July 2, 1956, Ser. No. 595,475
4 Claims. (Cl. 280—6)

Our invention relates generally to suspension systems for vehicles and more particularly to improvements in automatic control for pneumatic suspension systems.

It is well established that the use of pneumatic suspension to support the load carrying structure of a vehicle on the wheeled undercarriage is desirable in that the "rate" of the pneumatic suspension means may be varied with load conditions to maintain a minimum rate commensurate with the load and a desired predetermined normal height of the load carrying structure with respect to the terrain.

Adjustment of the spring rate of a pneumatic suspension means can be effected by manual operation of a control valve to admit and exhaust fluid under pressure to and from the pneumatic suspension means. However, it is desirable to accomplish this effect automatically and to this end various automatic height control mechanisms have been developed in the past to operate a valve for admitting to and exhausting fluid under pressure from the pneumatic suspension means responsive to the relative movement of the sprung and unsprung structures of the vehicle in relation to a predetermined normal spacing thereof. Examples of such mechanisms may be found in U.S. Patents #1,664,510 issued April 3, 1928 to H. R. Hughes, Jr.; #2,021,043 issued November 12, 1935 to A. V. Bedford et al; and #2,361,575 issued October 21, 1944 to T. H. Thompson.

It is also desirable to avoid operation of the control valve responsive to bumps in the road when there is no change in load carried by the vehicle and no need to compensate, thereby to avoid unnecessary use of air from the source of fluid under pressure and also to increase the life of the leveling valve. Attempts to satisfy this requirement are evidenced in U.S. Patents #1,664,510 and #2,021,043 mentioned above wherein spring biased lost motion connections and damping means have been employed. Such means are at best partially effective in that valve movement and compensation still result. Further, the employment of lost motion and damping means limit the accuracy of the height control mechanism.

A further effort toward positive elimination of undesired valve actuation and fluid pressure compensation in a height control means is found in U.S. Patent #2,427,927 issued September 23, 1947 to H. Schutte wherein a manually controlled cam means is utilized as a disconnect means between the valve to be actuated and the height control means.

It is an object of the subject invention to provide in a pneumatic suspension system improved means compensating for variations in load.

A further object is to provide a simple and reliable automatic control for vehicle pneumatic suspension means.

Another object is to provide an automatic control for vehicle pneumatic suspension means having maximum accuracy.

A further object is to provide an improved pneumatic suspension control means readily adaptable to cooperate with fluid pressure systems presently installed on vehicles and in novel combination with the same.

A further object is to provide an improved pneumatic suspension control means conditioned at will by the operator of the vehicle for automatic operation.

Figure 2:
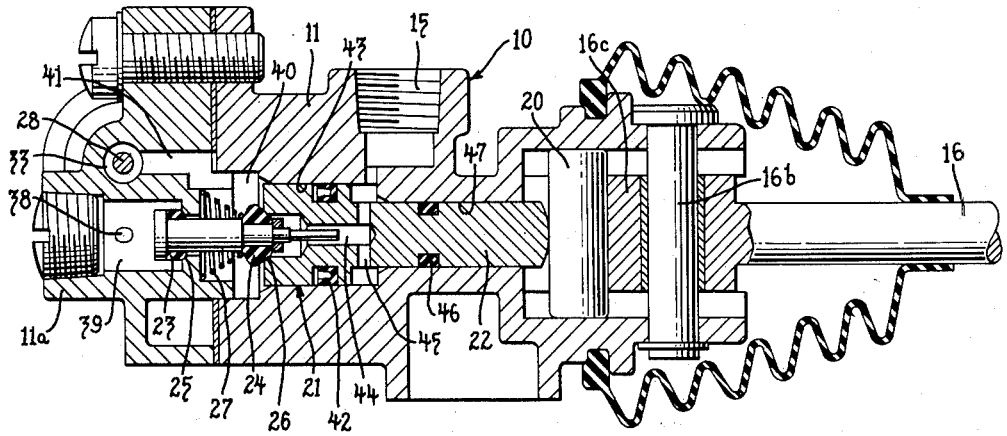
Figure 3:
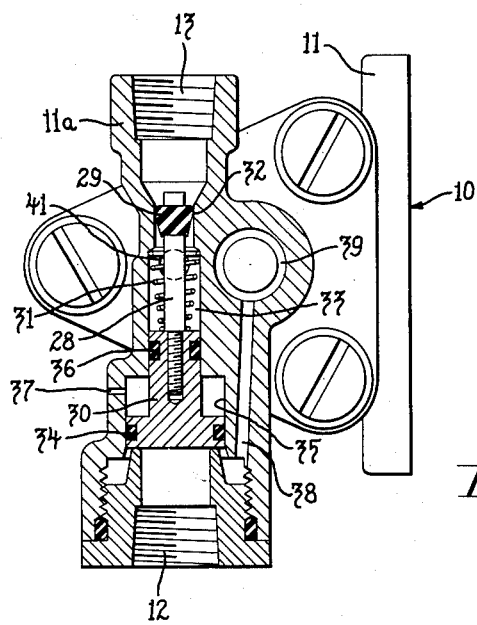
Figure 5:
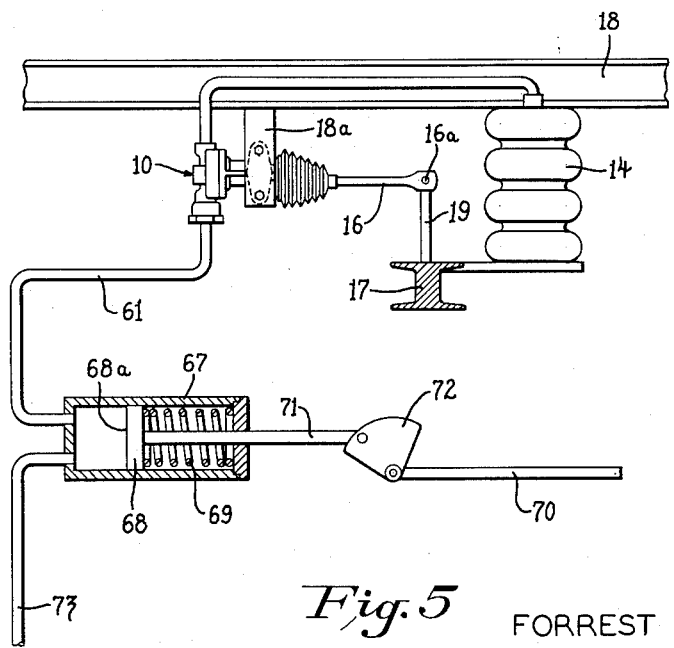

Other objects of the invention and desirable details of construction and combinations of parts will become apparent from the following description of preferred embodiments, which description is taken in conjunction with the accompanying drawings, in which:

FIGURE 1 is a side elevation of a control mechanism illustrative of our invention, FIGURE 2 is an enlarged view partially in cross-section taken on line 2—2 of FIGURE 1, FIGURE 3 is an enlarged end view and cross-section taken on line 3—3 of FIGURE 1, FIGURE 4 is a diagrammatic view of a portion of a trailer chassis pneumatic suspension and brake system with the automatic pressure control mechanism applied thereto, and FIGURE 5 is a diagrammatic view of a portion of a bus chassis and its associated pneumatic suspension with my control mechanism applied thereto.

Referring to FIGURES 1–4 inclusive of the drawings, in accordance with one aspect of our invention we provide a pneumatic suspension control valve 10 comprising a body 11 having a supply port 12 for receiving fluid under pressure, an outlet port 13 for delivering fluid under pressure to an air suspension unit 14 of a vehicle, an exhaust port 15 (FIGURE 2) for returning fluid pressure from the air suspension unit to atmosphere, valve means to be described hereinafter for controlling the supply and exhaust of fluid pressure to and from the suspension unit, and height control mechanism including a pivoted arm 16 (see FIGURE 4) for actuating the valve means responsive to relative movement of a wheeled undercarriage 17 and load supporting structure 18 of the vehicle. The valve body 11 of the control valve 10 is attached to the load carrying structure 18 by a suitable bracket 18a. The arm 16 is pivotally connected at one end as at 16a to a bracket 19 fixed to the undercarriage 17 and at its outer end to the valve 10 as at 16b (FIGURE 1).

Referring to FIGURES 1 and 2, the inner end of arm 16 is formed with a cam 16c which engages a slidable roller 20 forming a reciprocating means by which oscillatory motion of lever 16 is translated into reciprocatory motion. When a is placed on the load supporting structure 18 the arm 16 is pivoted on its pivot 16b in an upward direction, as indicated in FIGURE 1, toward applied position and roller 20 engages an adjacent end of slidable valve mechanism, indicated generally at 21, moving the mechanism to the left. The valve mechanism 21 includes a valve actuator 22 independently slidable, and valve elements including a supply valve 23 and exhaust valve 24 mounted on a common stem to slide in unison. Movement of the valve mechanism 21 to the left, as viewed in FIGURE 2, by operation of the cam 16c and roller 20 unseats the supply valve 23 from a valve seat 25 formed in a detachable head portion 11a of the body 11. The exhaust valve 24 by virtue of a return spring 27 remains seated on a valve seat 26 formed in an adjacent end of the valve actuator 22.

Referring to FIGURE 3 to control communication between the suspension unit 14 and the control valve 10 through port 13 in response to the establishment and depletion of fluid pressure at the port 12. Activating valve means are provided in the form of a fluid pressure responsive, normally closed check valve. The check valve comprises a connecting rod 28 having a check valve 29 mounted on one end adjacent port 13 and a piston 30 mounted on the other end adjacent port 12. The integral assembly is biased by a spring 31 to closed position of the check valve 29 on an associated seat 32 formed in a portion of a hollow passage 33 in the head 11a between the ports 12 and 13. The piston 30 is provided with an O ring seal 34 slidably engageable with the internal periphery of a cylindrical chamber 35 formed in the body 11a concentric with and of larger diameter than the passage 33. Seal 34 is provided to prevent the passage of air from the supply port 12 to the chamber 35. An additional O ring seal 36 is provided on a reduced portion of the piston slidable in the passage 33 to prevent the passage of air from passage 33 to chamber 35. Chamber 35 is provided with a small atmospheric port 37 to prevent an air lock in chamber 35.

Fluid under pressure entering supply port 12 unseats the check valve 29 by moving the piston 30 upward as viewed in FIGURE 3. Fluid under pressure also passes through a passage 38 formed in body portion 11a to a chamber 39 (see FIGURE 2) from whence it passes past open inlet valve 23 through a chamber 40 formed in body 11, through a passage 41 in body portion 11a communicating with passage 33 (see FIGURES 2 and 3) and past open check valve 29 to the outlet port 13 connected to the pneumatic suspension unit 14. Thus air is supplied to the suspension unit 14 to compensate for the load added to structure 18.

On the reduction of load on structure 18 the arm 16 moves toward exhaust position of valve mechanism as indicated in FIGURE 1. Such movement retracts the cam 16c from the roller 20 allowing the valve mechanism 21 and roller 20 to move to the right under fluid pressure on the left side of annular seal 42 positioned in a groove formed in the actuator 22 and forming a seal with the adjacent inner periphery 43 of the body 11. Supply valve 23 is seated by spring 27 and continued movement of the valve actuator 22 to the right unseats exhaust valve 24 by moving the valve seat 26 away from valve 24. Fluid under pressure from the air suspension unit 14 now passes through port 13 by open check valve 29 (the check valve remaining open because supply line pressure is acting on the piston 30), through passages 33, 41 and chamber 40 past open exhaust valve 24 and through a central axial passage 44 and radial ports 45 formed in the valve actuator 22 to the exhaust port 15. An additional annular seal 46 on the actuator 22 prevents the passage of air between the valve actuator and adjacent peripheral surface 47 of the body 11. Thus, air pressure is released from the pneumatic suspension unit 14 to compensate for lessening of load on the load supporting structure 18.

When the arm 16 is horizontal as shown in FIGURES 1 and 2 valves 23 and 24 are closed in lap position and air is neither supplied nor exhausted from the air unit.

To inactivate the valve mechanism so that air will not be supplied to or exhausted from the pneumatic suspension unit regardless of the position of the arm 16 it is necessary merely to discontinue the supply of fluid under pressure to the supply port 12. Air will not be supplied to the suspension unit because there is a lack of pressure and air will not exhaust from the suspension unit because there is no supply pressure to maintain the check valve 29 open and air pressure from the pneumatic unit seats the valve.

It should be noted (FIGURE 2) that the fluid pressure sealed slidable engagement of the actuator 22 with the interior cylindrical surfaces 43 and 47 of the body 11 develops a friction drag on movement of the actuator within the body 11. Such friction drag is greater than the force exerted by the spring 27 which is selected of a value to move the valves 23 and 24 and their connecting stems to the right to insure that one or the other of the valves 23 and 24 is always closed. However, the spring 27 is not sufficiently strong to overcome the friction of seals 42 and 46 and move the actuator 22. Movement of the actuator to the left as viewed in FIG. 2 depends on a force received from the cam 16c upon swinging of the arm 16 and is greatly in excess of the force required to overcome the friction drag. Movement of the actuator to the right is accomplished in response to pressure existing in chamber 40 and acting to the left of the actuator 22 on an effective area determined by the seal 42. However, when the source of pressure is interrupted pressure does not exist in chamber 40 and the actuator 22 can be moved to the left but cannot be returned to the right. Consequently, any movement of the lever 16 in an "apply" direction will move the actuator 22 to the left and it will remain in that position. Once the lever 16 has moved a maximum distance in an apply direction all subsequent movements of the lever 16 will be completely independent of the actuator 22 which remains stationary. This type of operation eliminates unnecessary movement and consequently wear of the valve mechanism during the time that pressure can neither be supplied to nor exhausted from the suspension mechanism due to interruption of the source of fluid pressure.

As pointed out above, movement of the actuator 22 to a stationary position upon failure of pressure in the chamber 40 is effective to close seat 26 upon exhaust valve 24 and to open the supply valve 23. However, pressure will not be supplied through the open supply valve 23 to the suspension units since pressure does not exist at the supply port 12. Furthermore, pressure cannot be reduced in the suspension unit since spring 31 will close valve 29 (FIG. 3) so that communication is interrupted with chamber 40. When pressure is reestablished at supply port 12, check valve 29 will be opened and pressure will be made available in chamber 40 from the supply port 12 to move actuator 22 to the right. After valve 23 closes, movement of the lever 16 will be effective to actuate the valves 23 and 24 to supply and exhaust pressure to and from the suspension unit.

In addition to the advantages mentioned above our improved control valve and height control means is particularly advantageous in being readily adaptable for cooperation with fluid pressure systems presently installed on vehicles. For example, referring to FIGURE 4 there is shown a portion of a conventional air brake system for a trailer comprising a brake reservoir 48, brake relay 49 and brake air chambers 50 together with a service line 51 and emergency line 52 all interconnected in conventional manner. The above mentioned brake system is well known in the art and widely used in commercial application. A brief description of its operation should suffice for an understanding of its cooperation with my pneumatic suspension control mechanism. In general the service and emergency lines are detachable from the tractor used to tow the trailer and receive fluid pressure from the tractor. The emergency line 52 receives a substantially constant fluid pressure which is supplied to the brake reservoir 48 through relay 49 to maintain a desired fluid pressure in reservoir 48. In turn reservoir 48 supplies fluid pressure to brake chambers 50 to apply the brakes under two conditions of relay 49. The first is normal brake operation wherein a fluid pressure controlled by the operator of the truck is received by relay 49 from service line 51, the relay in turn controlling the fluid pressure passed to the brake chambers 50 in accordance with the fluid pressure received from service line 51. The second is emergency or parking brake application in which upon loss of fluid pressure in the emergency line 52 the relay 49 passes the full fluid pressure of reservoir 48 to the brake chambers 50.

In accordance with an aspect of our invention we connect the control valve 10 to the above described brake system through a pilot type relay 53, a pneumatic suspension reservoir 54 and a feed valve 55. More particularly the relay 53 is provided as a means for activating and inactivating the control valve 10 dependent upon a predetermined fluid pressure supplied to the brake chambers 50 such that the control valve 10 will be inoperative for the major portion of normal braking operation but will be preset for operation when the emergency line 52 is disconnected or the brakes set full on for loading the trailer. In this respect relay 53 is provided with an inlet valve 56, an exhaust valve 57, an inlet port 58 connected by a line 59 to the suspension reservoir 54, an outlet port 60 connected by a line 61 to the supply port 12 of the control valve 10, an exhaust port 62, a fluid pressure responsive wall 63 operatively connected to the valves 56 and 57 and biased in one direction by fluid pressure in a control chamber 64 to open intake valve 56 and close exhaust valve 57, a spring 65 biasing the valves 56 and 57 in the opposite positions, and a line 66 connecting the control chamber 64 to a portion of the relay 49 in communication with brake chambers 50. In operation line 61 may be considered as a source of fluid pressure for the control valve 10 and is subject to the establishment or depletion of fluid pressure therein responsive to the valve of applied braking pressure on the trailer above or below a selected predetermined value dependent upon the selected rating of spring 65 and the fluid pressure working area of wall 63.

It should be noted that the system would work as well if the pilot relay 53 were connected directly to the brake reservoir 48 and the suspension reservoir 54 and feed valve 55 omitted. The reason for including the latter elements is to isolate the brake system from the suspension system and preclude any possibility of lowering fluid pressure in the brake reservoir 48 below a safe operating level. Thus, feed valve 55 is connected between the brake reservoir 48 and suspension reservoir 54 to pass air to the suspension reservoir only at pressures above a predetermined safe operating pressure in the brake reservoir. Such feed valves are conventional and need not be described in detail here.

Referring to FIGURE 5 we have illustrated diagrammatically the application of our control valve and height control mechanism to the pneumatic suspension system of a bus and responsive to the establishment and depletion of fluid pressure in a source connected to the control valve 10 for setting the valve in response to opening and closing the bus door. More particularly in FIGURE 5 we have shown a control valve, height control mechanism, load carrying structure, wheeled undercarriage, and pneumatic suspension unit identical with that shown in FIGURE 4 and having the same reference characters. In addition we have illustrated diagramatically a conventional door operating motor 67 having a piston 68 acted upon by a compression spring 69 to close a bus door 70 through the medium of a piston rod 71 and lever 72. The door is opened responsive to fluid pressure from a source indicated at 73 under control of the driver acting on a working face 68a of the piston 68. To set the control valve 10 for operation in response to opening of the door 70 the line 61 is connected to the door motor and the supply port 12 of the control valve. In this manner, the lines 73 and 61 are in constant communication with each other and with the chamber in the cylinder 67 formed to the left of the piston 68. Consequently, when pressure is admitted through lines 73 to move the piston 68 to the right as viewed in FIG. 5, the bus door will open and at the same time air will be delivered to the supply port 12 of the control valve. This permits the control valve to operate and compensate for any load variations on the vehicle as the passengers enter or leave through the open door of the bus.

In addition to the simplicity of our arrangement of a control valve, height control means and pneumatic suspension as disclosed above, as well as its inherent cooperative nature with respect to air systems presently installed on vehicles, it should be noted that there is no lost motion in the leveling valve and height control means. Immediate, positive response is provided affording maximum accuracy and reliability.

A further advantageous feature of our control valve affording maximum reliability is the arrangement whereby a single seal is employed to maintain fluid pressure in the pneumatic suspension unit on depletion of fluid pressure in the fluid pressure source and consequent inactivation of the control valve. That is, on depletion of fluid pressure in line 61 (FIGURE 4) the piston 30 (FIGURE 3) moves downward closing the check valve 29 to isolate the pneumatic suspension unit from the control valve 10. Regardless of the condition of additional sealing means in the valve 10 fluid will be maintained in the suspension unit as long as seal 29 is in proper order.

Our invention may be embodied in other specific forms without departing from the spirit or essential characteristics thereof. The present embodiments are therefore to be considered in all respects as illustrative and not restrictive, as various other forms will be apparent to those skilled in the art without departure from the spirit of the invention or the scope of the claims.

We claim:

1. In a vehicle having pneumatic suspension means interposed between the load supporting structure and the wheeled undercarriage and having a source of fluid pressure for supplying said suspension means, the combination of, control means operatively connected to said structure and said undercarriage to respond to relative movement of the latter and said structure, valve means movable to control the supply of fluid to and from said suspension means, additional means fluid connected with said source and being operative in one position to permit and in another position to prevent the supply of fluid to and the exhaust of fluid from said valve means, said valve means being operable upon a supply of pressure fluid from said source to engage said control means for controlling movement thereby, and upon interruption of said supply to permit movement of said control means independent of said valve means; said additional means including a single seal means for maintaining fluid pressure in said suspension means independently of the movement of said valve means upon interruption of a supply of pressure fluid from said source.

2. In a vehicle having pneumatic suspension means interposed between the load supporting structure and the wheeled undercarriage in addition to a source of fluid pressure on the vehicle, height control means connected to said structure and said undercarriage to move in response to relative movement of the two, control valve means fluid connected to said source and engageable with said height control means and movable thereby, activating valve means being movable from a first position permitting communication between said control valve means and suspension means and a second position isolating them from each other, biasing means urging said activating valve means toward said second position, said activating valve being movable to and maintained in said first position in response to fluid pressure from said source to place said suspension means in communication with said control valve means, said control valve means being operable in opposite directions from a lap position alternately to supply and exhaust fluid pressure to and from said suspension means when said activating valve is in said first position, said activating valve means being operative in its second position to maintain fluid pressure in said suspension means independently of movement of said valve means.

3. In a vehicle, pneumatic suspension means interposed between the load supporting structure and the wheeled undercarriage, a source of fluid pressure on said vehicle controlled at will by the operator, control valve means connected to said source and having valve elements operable from a lap position in opposite directions to respectively control the supply and exhaust fluid pressure to and from said pneumatic suspension means, control means connected to said structure and undercarriage and responsive to relative movement thereof to control the operation of said valve elements when operatively connected thereto, said valve elements being biased into operative connection with said control means upon delivery of fluid pressure from said source, activating valve means interposed between said suspension means and said control valve means and being movable from a first position permitting communication between said control valve means and suspension means and a second position isolating them from each other and maintaining pressure in said suspension means independently of the movement of said control valve means, biasing means urging said activating valve means toward said second position, piston means connected to said activating valve means and having opposite sides exposed to the atmosphere and to said source, said piston means being responsive to fluid pressure from said source to move and maintain said activating valve means in said first position to permit control of said fluid suspension means by said control valve means.

4. In a vehicle having a wheeled undercarriage, a load supporting structure, pneumatic suspension means for resiliently supporting said structure on said undercarriage and a source of fluid under pressure controlled by the operator, improved means controlling fluid pressure in said suspension means automatically responsive to relative movement of said structure and said undercarriage to maintain a predetermined standing height of said structure regardless of the changes in load thereon, said improved means comprising a pivoted lever connected at spaced points to said structure and undercarriage independently of said suspension means, reciprocating means operatively connected to said lever to translate oscillatory motion of said lever to reciprocatory motion, control valve means having slidable valve elements operatively connectable to said reciprocating means to be reciprocated thereby, means connecting said control valve means to said source, and fluid pressure seal means forming part of said control valve means and being responsive to pressure from said source to continuously bias said valve elements into operative connection with said reciprocating means, said control valve means being moved to an inoperative position in response to movement of said lever on interruption of said fluid pressure from said source, said valve elements being operable in opposite directions from lap position to supply and exhaust fluid pressure to and from said suspension means when fluid pressure is applied from said source and being inoperable in the absence of fluid pressure from said source.

References Cited in the file of this patent

UNITED STATES PATENTS

| | | |
|---|---|---|
| 1,555,199 | Gouirand | Sept. 29, 1925 |
| 1,816,075 | Down | July 28, 1931 |
| 2,618,121 | Tucker | Nov. 18, 1952 |
| 2,787,475 | Jackson | Apr. 2, 1957 |
| 2,820,647 | Jackson | Jan. 21, 1958 |

FOREIGN PATENTS

| | | |
|---|---|---|
| 3,974 | Great Britain | Feb. 25, 1905 |

UNITED STATES PATENT OFFICE

CERTIFICATE OF CORRECTION

Patent No. 3,127,189                              March 31, 1964

Forrest O. E. Schultz et al.

It is hereby certified that error appears in the above numbered patent requiring correction and that the said Letters Patent should read as corrected below.

Column 2, line 45, after "a" insert -- load --; line 64, for "part 12. Activating" read -- part 12, activating --; column 5, line 17, for "valve" read -- value --; column 6, line 5, for "until" read -- unit --.

Signed and sealed this 28th day of July 1964.

(SEAL)

Attest:

ESTON G. JOHNSON
Attesting Officer

EDWARD J. BRENNER
Commissioner of Patents